May 18, 1971  M. S. BLOOM ET AL  3,579,300
CONTINUOUS PROCESS FOR THE PRODUCTION OF CALCIUM SULPHATE
HEMI-HYDRATE FROM GYPSUM
Filed Aug. 4, 1969  3 Sheets-Sheet 1

Inventors
MARTIN S BLOOM
MARTIN GRANGER BROWN
By
Cushman, Darby & Cushman
Attorneys United States Patent Office 3,579,300
Patented May 18, 1971

3,579,300
CONTINUOUS PROCESS FOR THE PRODUCTION OF CALCIUM SULPHATE HEMI-HYDRATE FROM GYPSUM
Martin S. Bloom, Norton-on-Tees, and Martin Granger Brown, Runcorn, England, assignors to Imperial Chemical Industries Limited, London, England
Continuation-in-part of abandoned application Ser. No. 414,244, Nov. 27, 1964. This application Aug. 4, 1969, Ser. No. 847,022
Claims priority, application Great Britain, Dec. 3, 1963, 47,675/63
Int. Cl. C01f 11/46
U.S. Cl. 23—122          6 Claims

ABSTRACT OF THE DISCLOSURE

Process for producing calcium sulphate alpha-hemihydrate by subjecting a slurry of gypsum and water to superatmospheric pressure sufficient to maintain the water in the liquid state at a preselected mean temperature of at least 130° C., continuously passing the said slurry into a reactor having an inlet and an outlet, injecting into said slurry sufficient steam at a pressure and temperature sufficient to maintain said slurry in the reactor at least at said superatmospheric pressure and preselected mean temperature, continuously agitating said slurry in reactor, and continuously withdrawing calcium sulphate alpha-hemihydrate from the outlet without reducing the pressure therein.

Figure 1:
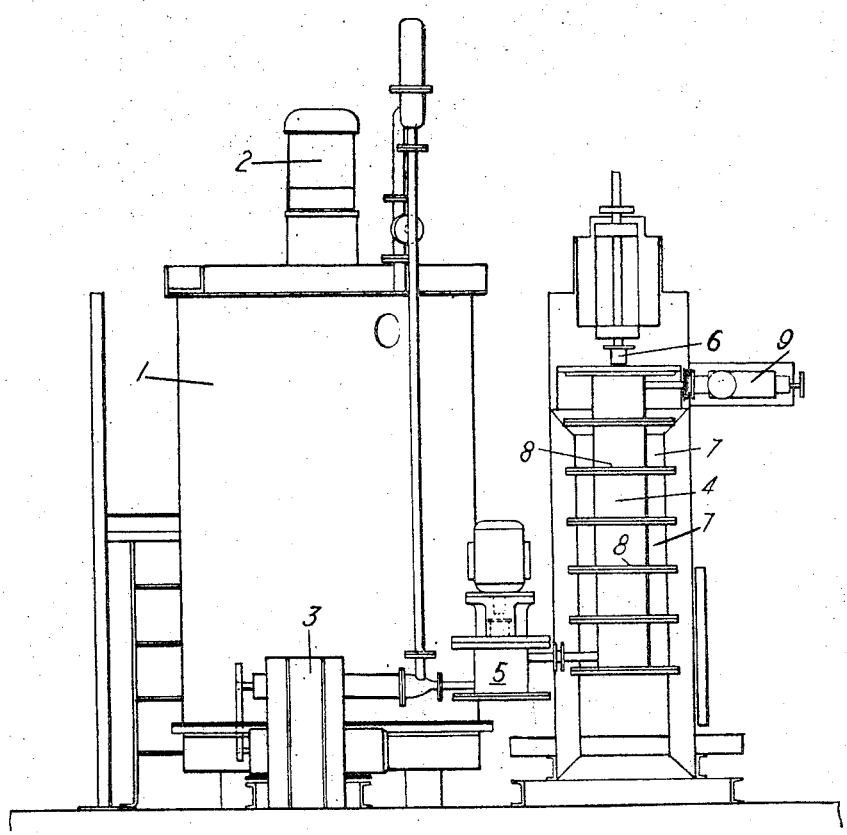

This application is a continuation-in-part of our application Ser. No. 414,244, filed Nov. 27, 1964.

The present invention provides a continuous process for the production of calcium sulphate alpha-hemihydrate from gypsum.

Various processes for converting naturally-occurring gypsum to calcium sulphate hemihydrate are very well known. These include:

(a) Heating dry natural gypsum, at atmospheric pressure, in a kettle or rotary calciner for several hours; this produces calcium sulphate beta-hemihydrate;

(b) Autoclaving lumps of natural gypsum in an atmosphere of steam for several hours; this produces a calcium sulphate hemihydrate which is approximately midway between the alpha and beta varieties;

(c) Autoclaving ground natural gypsum with water and certain carboxylic acids for about two hours; this produces calcium sulphate alpha-hemihydrate;

(d) Wetting the exterior surfaces of lumps of natural gypsum with a crystal-habit modifier and subsequently autoclaving in an atmosphere of saturated steam for anything from 6½ to 16 hours; this produces calcium sulphate alpha-hemihydrate with a considerable quantity of anhydrous calcium sulphate which does not hydrate back to gypsum.

The processes described in the immediately preceding paragraph are open to various objections, for example that they produce beta-hemihydrate, or a mixture of alpha- and beta-hemihydrates, or excessive amounts of anhydrous calcium sulphate; in fact, the only one of said processes which produces acceptable alpha-hemihydrate is the process (c) where ground gypsum is autoclaved under water and which is the classic process for producing alpha-hemihydrate upon which we have now improved. Additionally, all the processes described in the immediately preceding paragraph require an inordinately long time to convert the gypsum to hemihydrate (though an exception may be made in the case of the dry process (a) where very rapid conversion can be obtained provided there is no objection to the corresponding unsuitability of the product).

The process of our present invention is not open to the objections listed hereinabove since it produces alpha-hemihydrate without anhydrous calcium sulphate, and enables over 90% conversion of byproduct gypsum to alpha-hemihydrate to be obtained in as many minutes as the previously-known processes take hours.

In accordance with our present invention there is provided a process for the continuous production of calcium sulphate alpha-hemihydrate from gypsum, which comprises the steps of forming a slurry of gypsum and water, subjecting said slurry to a superatmospheric pressure sufficient to maintain the water in the liquid state at a preselected mean temperature of operation of at least 130° C., continuously passing said slurry at said superatmospheric pressure into a reactor having an inlet and an outlet, injecting into said slurry sufficient steam at a sufficiently high pressure and temperature to maintain said slurry in the reactor at least at said superatmospheric pressure and said preselected mean temperature, controlling the flow of said slurry from said inlet to said outlet, continuously agitating said slurry in the reactor, and continuously withdrawing calcium sulphate alpha-hemihydrate slurry from said outlet without reducing the pressure in the reactor.

For any given preselected mean temperature of operation, the conversion of the gypsum and water slurry to a slurry of calcium sulphate alpha-hemihydrate and water generates a certain autogenic pressure in the reactor, and to ensure that the water remains entirely in the liquid phase the whole time it is in the reactor, it is necessary to ensure that the superatmospheric pressure in the reactor exceeds the autogenic pressure, preferably by at least 10 p.s.i. and more preferably by about 20 p.s.i. The following Table I sets forth (approximately) the autogenic pressures of the slurry at various mean temperatures of operation and (by adding 20 p.s.i. thereto) convenient superatmospheric reactor pressures to be used in each case. It will be observed that for mean slurry temperatures of operation between about 130° C. and 175° C., suitable superatmospheric reactor pressures range from about 4 to 10 atmospheres. It is, however, preferred to operate at mean slurry temperatures between about 140° C. and 160° C., and more particularly at about 150° C.

TABLE I

| Mean slurry temperature,° C. | Autogenic pressure of slurry (p.s.i. atm.) | Reactor pressure (p.s.i. atm.) | Reactor pressure (atmospheres) |
|---|---|---|---|
| 130 | 39.2 | 59.2 | 4.0 |
| 135 | 45.4 | 65.4 | 4.4 |
| 140 | 52.4 | 72.4 | 4.9 |
| 145 | 60.3 | 80.3 | 5.4 |
| 150 | 69.0 | 89.0 | 6.0 |
| 155 | 78.9 | 98.9 | 6.7 |
| 160 | 89.6 | 109.6 | 7.4 |
| 165 | 101.6 | 121.6 | 8.3 |
| 170 | 114.9 | 134.9 | 9.2 |
| 175 | 129.4 | 149.4 | 10.1 |
| 180 | 145.4 | 165.4 | 11.2 |

Clearly, in order to inject steam into the reactor, it must be at a temperature such that the injected steam pressure exceeds the superatmospheric pressure in the reactor, conveniently by about 10 p.s.i. or more.

The superatmospheric pressure in the reactor and the mean temperature of the slurry in the reactor are controlled independently of each other, and the flow of the slurry from the inlet to the outlet of the reactor is controlled independently of the pressure and temperature controls. During its period of residence within the reactor, the gypsum is dehydrated in the presence of liquid water, and undergoes a phase change to calcium sulphate alpha-hemihydrate, and the purpose of controlling the flow of the slurry through the reactor is to ensure that the bulk of the gypsum particles remains in the reactor sufficiently long for such phase-change to take place.

The production of alpha-hemihydrate of commercially useful crystalline structure can be encouraged by the addition to the gypsum slurry of known crystal habit modifiers. These include, for example, inorganic salts of highly charged metal ions, such as iron, aluminium, chromium; and polar organic compounds, for example acids and salts of acids.

Figure 2:
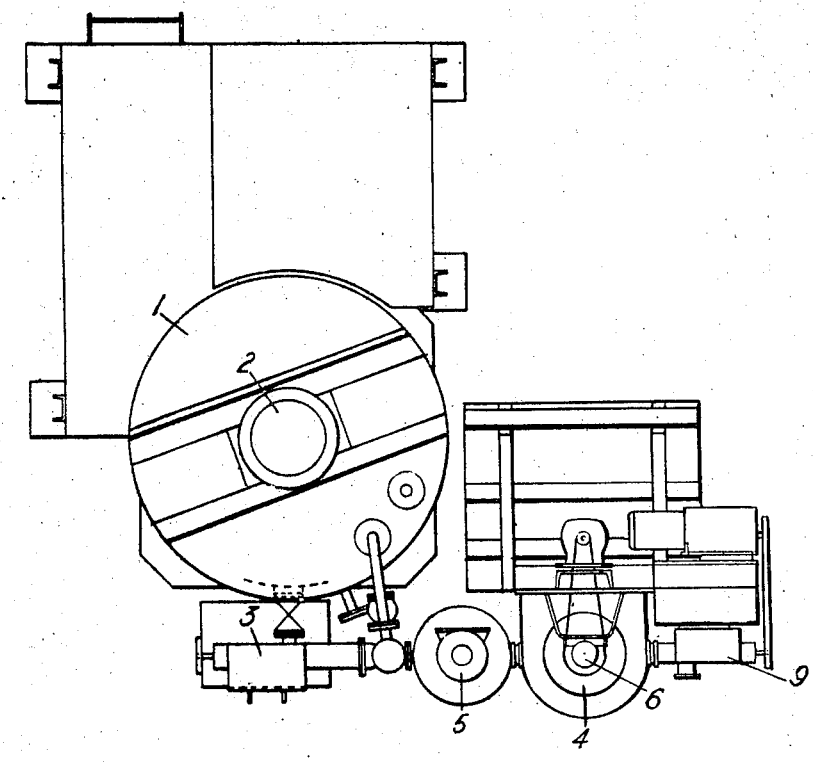
Figure 3:
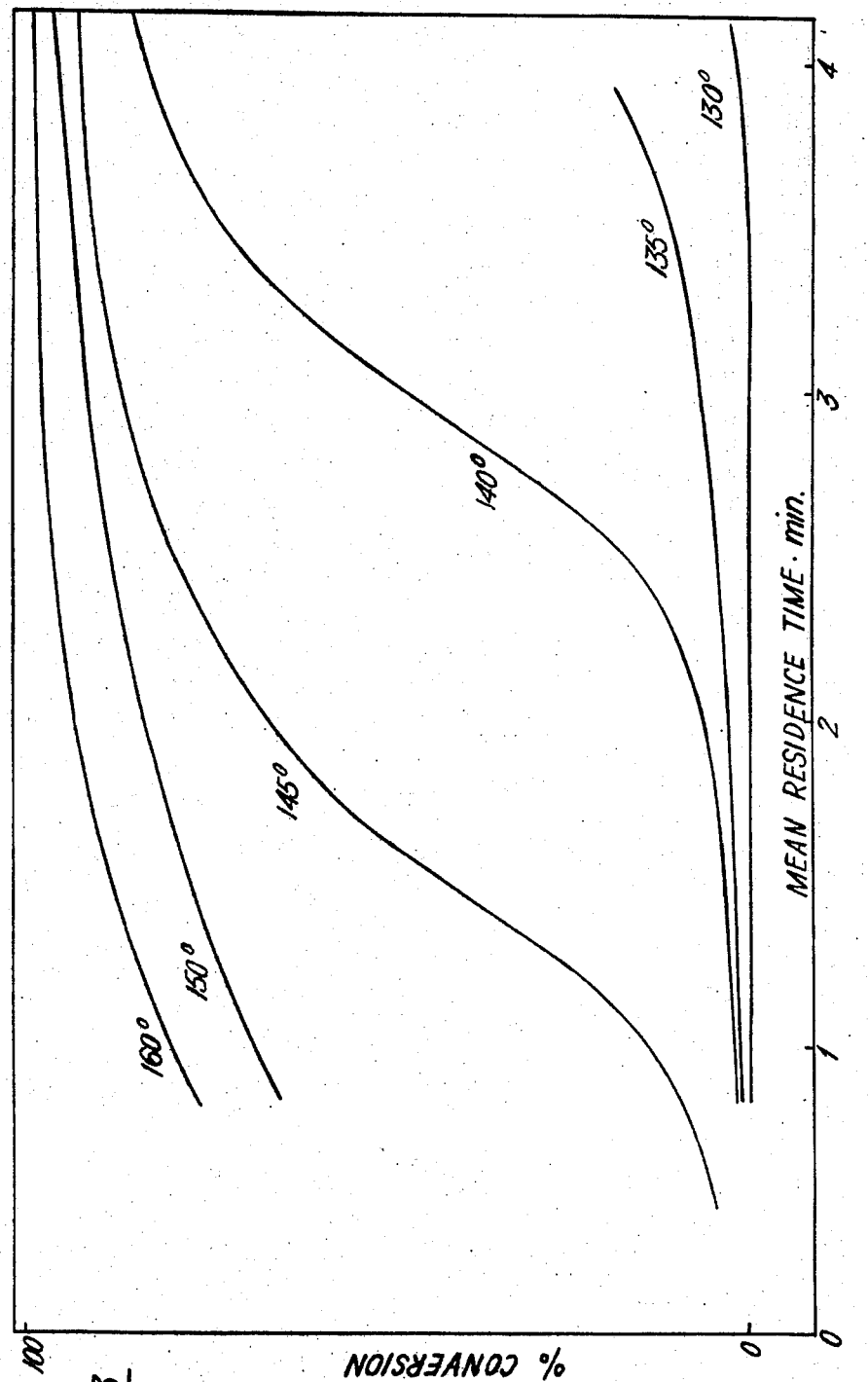

The invention will now be described, by way of example only, with reference to the accompanying drawings in which FIGS. 1 and 2 are, respectively, an elevation and plan of one form of apparatus suitable for carrying out the process of the invention, and FIG. 3 is a graph in which mean residence time in part of the reactor is plotted against percent-conversion of a gypsum slurry to calcium sulphate alpha-hemihydrate.

The gypsum used in the invention may be obtained from any source, and may be either wet or dry. Conveniently, however, it is wet gypsum recovered as waste from an industrial process such as, for example, the manufacture of phosphoric acid from phosphate rock (usually known as "by product gypsum"). In either case, it is mixed with water (if desired, together with a crystal habit modifier such as aluminium sulphate or citric acid) in a gypsum slurry tank 1 fitted with a stirrer 2 (and preferably provided with heating means) to form a slurry. This slurry is then subjected to a pressure sufficient to maintain the water in the liquid state at the preselected temperature of operation, for example of the order of about 4 to 10 atmospheres, by any conventional means, for example by means of a slurry pump 3, which may be a centrifugal pump, positive displacement screw pump or the like, and passed under such pressure into the inlet of a reactor comprising two interconnected autoclaves 4, 5. The slurry is heated to a temperature between 130° C. and 175° C., for example to between 140° C. and 160° C., and although this heating step may be carried out in the main autoclave 4 of the reactor, it is more conveniently carried out in a subsidiary autoclave 5 thereof, fitted with a stirrer, just prior to the introduction of the slurry into the main autoclave 4, by the injection into the slurry of high pressure steam, in which case further high pressure steam may be injected into the main autoclave 4 to maintain the temperature of the reaction.

In FIG. 3 of the accompanying drawings, the mean residence time of the heated slurry in the subsidiary autoclave 5 of an experimental continuous reactor has been plotted against percent-conversion of the gypsum to alpha-hemihydrate in the autoclave 5 at various temperatures between 130° C. and 160° C. Given sufficiently long residence times, complete conversion occurs at any temperature above about 100° C., but the reaction reaches its optimum economic balance at mean slurry temperatures above 130° C. The choice of reaction temperature is dependent upon the relative costs of apparatus and fuel, unless an uneconomically low reaction rate is required to produce a particular crystal habit.

FIG. 3 of the drawings shows that even at 140° C., over 90% conversion of gypsum to alpha-hemihydrate can be obtained (without anhydrous calcium sulphate) in about 5 minutes in the subsidiary autoclave 5. If a higher degree of conversion is required, the mixed slurry (containing 10% unconverted gypsum) is passed to the main autoclave 4 where 90% of the unconverted gypsum is converted to alpha-hemihydrate in about another 5 minutes, thus giving 99% conversion in about 10 minutes. FIG. 3 shows that conversion is even more rapid at 145° C., 150° C. and 160° C. Conversion is less rapid at 135° C. and 130° C. (90% conversion being obtained in about 7½ and 10 minutes respectively) and therefore we prefer to operate at 140° C. or above, though even at the lower temperatures conversion is more rapid than in the prior art. Generally speaking, we prefer not to operate at above 160° C. for purely economic reasons, since above this temperature heat losses are on the high side.

It is pointed out that in order to be commercially, industrially and economically acceptable, alpha-hemihydrate plaster does not need to be 100% alpha-hemihydrate. For example, U.S. Pat. 2,460,267 claims "a plaster of Paris consisting mainly of hemihydrate crystals of squat shape," and the plaster of U.S. Pat. 2,448,218 is not considered unacceptable because it contains a proportion of anhydrous calcium sulphate (which does not hydrate back to gypsum). U.S. Pat. 2,907,667 lists (Cols. 5 and 6) a number of apparently acceptable alpha-hemihydrate plasters together with their combined water contents. Theoretically, the combined water content for $CaSO_4 \cdot \tfrac{1}{2}H_2O$ is 6.2% by weight, so it is clear that many of the plasters of U.S. Pat. 2,907,667 contain considerable quantities of anhydrous calcium sulphate (which does not hydrate back to gypsum) and some contain unconverted gypsum. In fact many of them may contain both.

The above-mentioned U.S. Pat. 2,907,667 uses a "calcination" period of the order of 6½ to 16 hours, and mentions that U.S. Pat. 2,448,218 uses an autoclaving period of at least two hours; U.S. Pat. 2,460,267 does not specifically mention the autoclaving period but it would appear to be about the same as in U.S. Pat. 2,448,218. These autoclaving periods are in marked contrast to those of the present invention which achieves in as many minutes what the above-mentioned prior patents achieve in hours.

We attribute the very rapid conversion rates obtained by the present invention to the fact that high pressure steam is injected into the gypsum slurry while it is under pressure. The gypsum slurry is already at a superatmospheric pressure (which is in excess of that required to maintain the water in the liquid phase within the reactor). The steam to be injected is, naturally, at a higher pressure than the gypsum slurry. Injection of high-pressure steam into the slurry not only maintains the slurry at a preselected mean or bulk temperature (for example, at 150° C.) but also causes rapid local formation, around the steam injection point or points, of alpha-hemihydrate crystals which act as nuclei or seed crystals for the reaction, thereby speeding up the overall conversion rate in the reactor.

By way of example only, the main autoclave 4 of the reactor may be in the form of a tube, for example a vertical tube, having an inlet at the bottom and an outlet at the top, a substantially central stirrer shaft 6 driven by a variable speed motor through a mechanical seal, and at least one high pressure steam injection nozzle. In order to control and guarantee the residence time in the reactor of the bulk of the gypsum particles by reducing by-passing, and thereby reducing the size of the reactor required for the production of a desired purity of hemihydrate, the tube-shaped main autoclave 4 of the reactor may be divided internally into a number of compartments 7 (for example six compartments) each provided with a high pressure steam injection nozzle, the compartments being situated one above the other and separated from each other by separating plates 8 each provided with at least a central aperture through which the central stirrer shaft 6 and the slurry pass. Blades (not shown) are provided on the shaft 6 in the compartments 7 to fulfill the functions of stirring and maintaining the rapidly sedimenting solids in suspension. The separating plates 8 are so designed as to be readily removable, and the tube-shaped autoclave 4 itself may be a composite tube consisting of a plurality of separate tube-sections assembled one above the other. By varying the speed of the shaft 6, by removing one or more of the separating plates 8 and/or by replacing them with separating plates having larger or smaller central apertures, and/or by increasing or decreasing the length of the tube-shaped autoclave 4 (by the addition or subtraction of tube sections) any desired period of residence of the bulk of the gypsum particles in the main autoclave 4 can be achieved. By way of example only, such period of residence may vary from about 30 seconds up to less than 30 minutes.

It is within the scope of the invention to vary such residence time in other ways, for example by forming or providing the tube-shaped main autoclave 4 of the reactor with internal constrictions between adjacent compartments 7, or by replacing the compartments 7 and stirrer 6 by a screw adapted to lift the slurry, at a predetermined speed, from the inlet at the foot of the autoclave reactor to the outlet at the top.

At the outlet, the hemihydrate slurry is continuously withdrawn from the autoclave, for example at approximately 4 to 10 atmospheres pressure, and released (for example, directly to a plaster board plant) at about atmospheric pressure, without releasing or reducing the pressure in the autoclave. This is accomplished by any desired form of let-down means 9, for example a throttling valve, but to avoid blockage it is preferably effected by a positive displacement screw pump with a rubber stator (for example by a mono-pump) fitted with a variable speed drive which may also act as a metering device. If the slurry is not required for immediate use, it may be dried and the resulting plaster stored or bagged.

The invention is particularly advantageous in that it is a continuous process and can employ and purify a wet impure starting material, such as by-product gypsum, and deliver alpha-hemihydrate ready for use in slurry form, thereby eleminating the necessity for any drying steps. It is furthermore very efficient thermally in that it removes the water of crystallisation of gypsum as liquid water, using only a moderate pressure.

The product, calcium sulphate alpha-hemihydrate, is particularly, though not exclusively, useful in the manufacture of plaster building products.

In one set of tests, a gypsum slurry was formed from by-product gypsum recovered from the acidulation of Nauru phosphate rock with sulphuric acid. The gypsum: water ratio of the slurry was 40:60. The slurry was divided into two portions which were tested, consecutively, in an apparatus similar to that illustrated in FIG. 1 of the drawings, except that the tube-shaped autoclave 4 was subdivided by partitions into only 5 adjacent compartments. (The experimental data and results given hereafter all refer to conditions, conversion rates and steam injection only in the lowermost of these 5 compartments; no steam was injected into the subsidiary autoclave 5.) In both tests, the mean temperature and the pressure in the reactor were about 150° C. and 6 atmospheres.

In the first test, the steam was injected at a temperature in the range 150° C. to 170° C. In the second test, the steam was injected at a temperature in the range 190° C. to 200° C. For each of these tests, the fractional conversion to alpha-hemihydrate in the lowermost compartment of the tube-shaped autoclave 4 was compared with the slurry's residence time therein. The results of these two tests are tabulated hereunder:

| First test injected steam at 150° C. to 170° C. | | Second test injected steam at 190° C. to 200° C. | |
| --- | --- | --- | --- |
| Fractional conversion | Residence time (minutes) | Fractional conversion | Residence time (minutes) |
| 0.1 | 0.4 | 0.1 | 0.12 |
| 0.2 | 0.75 | 0.2 | 0.25 |
| 0.3 | 1.0 | 0.3 | 0.3 |
| 0.4 | 1.25 | 0.4 | 0.4 |
| 0.5 | 1.5 | 0.5 | 0.55 |
| 0.6 | 1.75 | 0.6 | 0.75 |
| 0.7 | 2.0 | 0.7 | 1.1 |
| 0.8 | 2.6 | 0.8 | 1.75 |

The remainder of the conversion occurs, of course, in the remaining compartments of the autoclave 4. In the second compartment of the same autoclave a further 80% of the unconverted gypsum is converted to alpha-hemihydrate, so that after two compartments, the total conversion is already 96%.

These figures clearly show that in both tests the rate of conversion was infinitely faster than in any known prior art and we attribute this to the use of steam injection. In the second test the rate of conversion was from 3 times to 1½ times as rapid as in the first test, and we believe that this is attributable to the fact that the injected steam in the second test was at a higher temperature and pressure than in the first; that, as a consequence, a larger number of alpha-hemihydrate nuclei or seed crystals were formed in the second test than in the first; and that, as a consequence, the rate of conversion from gypsum to alpha-hemihydrate was greater in the second test than in the first. It is to be noted that the results tabulated above are not even the shortest achievable residence times for a given fractional conversion; other parameters can be adjusted for optimally short residence times.

We claim:

1. A process for the continuous production of calcium sulphate alpha-hemihydrate from gypsum, which comprises the steps of forming a slurry of gypsum and water, subjecting said slurry to a superatmospheric pressure sufficient to maintain the water in the liquid state at a preselected mean temperature of operation of at least 130° C., continuously passing said slurry at said superatmospheric pressure into a reactor having an inlet and an outlet, injecting into said slurry sufficient stream at a sufficiently high pressure and temperature to maintain said slurry in the reactor at least at said superatmospheric pressure and said preselected mean temperature, controlling the flow of said slurry from said inlet to said outlet, continuously agitating said slurry in the reactor, and continuously withdrawing calcium sulphate alpha-hemihydrate slurry from said outlet without reducing the pressure in the reactor.

2. A process as claimed in claim 1, wherein said superatmospheric pressure is at least 10 p.s.i. in excess of the autogenic pressure of said slurry of gypsum and water at said preselected mean temperature of operation.

3. A process as claimed in claim 2, wherein said superatmospheric pressure is about 20 p.s.i. in excess of the autogenic pressure of said slurry of gypsum and water at said preselected mean temperature of operation.

4. A process as claimed in claim 3, wherein said superatmospheric pressure is between about 4 and 10 atmospheres and said preselected mean temperature of operation is between about 130° C. and 175° C.

5. A process as claimed in claim 4, wherein said mean temperature of operation is between about 140° C. and 160° C.

6. A process as claimed in claim 5, wherein said mean temperature of operation is about 150° C.

References Cited

UNITED STATES PATENTS

| 2,907,668 | 10/1959 | Nies et al. | 23—122 |
| 3,081,152 | 3/1963 | Johnson | 23—122 |
| 3,410,655 | 11/1968 | Ruter et al. | 23—122 |
| 3,423,172 | 1/1969 | Cafferata | 23—122 |

FOREIGN PATENTS

| 1,125,989 | 9/1968 | England | 106—110 |
| 1,156,789 | 2/1969 | England | 106—110 |

OSCAR R. VERTIZ, Primary Examiner

G. A. HELLER, Assistant Examiner